(12) United States Patent
Olsen

(10) Patent No.: US 6,638,017 B1
(45) Date of Patent: Oct. 28, 2003

(54) CONSTANT ROTATIONAL SPEED PROPELLER FOR MODEL AIRCRAFTS

(76) Inventor: Arild Olsen, Huldreveien 37, 1388 Borgen (NO)

( * ) Notice: Subject to any disclaimer, the term of this patent is extended or adjusted under 35 U.S.C. 154(b) by 0 days.

(21) Appl. No.: 09/908,454

(22) Filed: Jul. 16, 2001

(30) Foreign Application Priority Data

Jul. 17, 2000 (NO) .................................. 003646

(51) Int. Cl.$^7$ ................................ B64C 11/30
(52) U.S. Cl. ..................... 416/30; 416/47; 244/190
(58) Field of Search ................... 416/27, 30, 47, 416/48, 61, 44; 244/190

(56) References Cited

U.S. PATENT DOCUMENTS

| | | | |
|---|---|---|---|
| 5,209,640 A | | 5/1993 | Moriya ................. 416/27 |
| 5,222,022 A | * | 6/1993 | Adams et al. .......... 701/110 |
| 5,299,911 A | | 4/1994 | Moriya ................. 416/35 |
| 5,413,461 A | * | 5/1995 | Johnsen ................ 416/1 |
| 5,451,141 A | * | 9/1995 | Carvalho et al. ........ 416/152 |

FOREIGN PATENT DOCUMENTS

DE 29 25 446 A1 2/1980

* cited by examiner

*Primary Examiner*—Edward K. Look
*Assistant Examiner*—Kimya N McCoy
(74) *Attorney, Agent, or Firm*—Sierra Patent Group, Ltd.

(57) ABSTRACT

A control device for use in unmanned model aircraft for a constant speed propeller is disclosed. The device comprises a propulsion engine coupled to the propeller. The rotational speed of the propulsion engine is regulated through an automatic change of the angle of attack of the propeller and a manual or automatic adjustment of the throttle. It also comprises an electric servomotor device, a power transmission and a controller. The servomotor device is positively coupled to the propeller via the power transmission. The controller controls the servomotor device. The variable angle of attack of the propeller is adjusted by the power transmission from the servomotor device and the propulsion engine, manually by an operator or automatically by the controller.

7 Claims, 2 Drawing Sheets

CONSTANT ROTATIONAL SPEED PROPELLER FOR MODEL AIRCRAFTS

THE BACKGROUND OF THE INVENTION

Model aircrafts are becoming increasingly more complicated and advanced as new electronics and new materials become available. The builder of model aircrafts constantly attempts to improve his model, to make it look like and fly approximately like large, manned airplane. The model aircrafts may be built larger than e.g. a scale of 1:3, and equipped with large gasoline engines of more than e.g. 150 $cm^3$. The engines are either two-stroke or four-stroke, with one or more cylinders. The engines may also be of the turbine type. Since a model aircraft is usually smaller than a manned aircraft, smaller engines are used. In order for a small engine to be able to yield the desired effect, it must work at a high speed as compared with a large engine. This means that the model engine practically has to use a relatively small propeller, as compared with the true scale. If a proper scale model would be used, the model engine would not manage the desired effect. This is because the diameter of the scale propeller together with the propeller's angle of attack will be too large a strain on the model engine.

An engine yields most effect only at one certain speed and in order to make it possible to build a model aircraft with a scale true propeller and a propeller that may be adjusted to the performance of the engine, it is necessary to use a propeller with a variable angle of attack.

U.S. Pat. Nos. 5,209,640 and 5,299,911 describe a hydraulically operated, electronically controlled, propeller pitch angel controller intended for use in aircrafts. These solutions use complicated sensors transmitting signals to the microprocessor in a microcomputer. U.S. Pat. No. 5,299,911 uses three sensors informing about the engine speed, the carburettor position and the carburettor's intake pressure. U.S. Pat. No. 5,209,640 has sensors informing about the flying speed, atmospheric pressure, atmospheric temperature, engine speed and the carburettor position.

The U.S. Pat. Nos. 5,209,640 and 5,299,911 describe a microcomputer receiving signals from the sensors to control a hydraulic transmission device, allowing the propeller's angle of attack to be adjusted. An external pump run by the propulsion engine of the aircraft drives the hydraulic device. Other, not cited, solutions use the propulsion engine's oil pressure to directly adjust the attack angle of the propeller. The latter is a completely mechanical solution, not using electronic control. It is reasonable to assume that such solutions include heavy and large equipment, making the use in model aircrafts unsuitable. Thus, it may be understood that the above-mentioned solutions are intended for use in manned aircrafts. It would also be problematic and expensive to scale such equipment down for practical use in model aircrafts.

The U.S. Pat. Nos. 5,209,640 and 5,299,911 use 5 and 3 sensors, respectively, to provide the input signals for control of the propeller's angle of attack. This is more than practically necessary to control the propeller's angle of attack in a model aircraft. The solutions in the U.S. Pat. Nos. 5,209,640 and 5,299,911 thus represent additional weight and also complicate the control of the angle of attack through more parameters. The present invention comprise only one propeller speed sensor, signalling to one or more micro controllers, and power to the adjustment of the propeller's angle of attack is provided by an electric servomotor, providing low weight and size. Thus, the present invention represents a solution suitable for use in model aircrafts.

There is a large selection of model aircraft engines for use in various types of model aircrafts. It is also desirable that the engine at all times operates as close to the maximum efficiency as possible. There is thus a need for setting the right working speed and regulation response before the flying takes place. The present invention allows this, through a suitable interface between the model aircraft and the pilot of the model aircraft. This interface may e.g. be a keypad to set the desired speed of the engine and the system's regulation response, and a display for reading. The U.S. Pat. Nos. 5,209,640 and 5,299,911 mention no equivalent solution.

In other, not cited, solutions, the speed may be adjusted during the flying of manned aircrafts and stationary, manned aircrafts. The regulation response may, however, not be adjusted by the pilot, neither for stationary aircrafts nor during the flying.

SUMMARY OF THE INVENTION

The present invention concerns an electronic propeller controller for use in model aircrafts. The engine's carburettor position is primarily controlled by the operator, while the propeller's angle of attack is controlled by the propeller controller. There is, however, a possibility for automatic adjustment of the carburettor position of the control unit, although the operator will primarily do this manually before or during the flight.

The speed of the aircraft is given by the propeller's propulsive force and the aircraft's aerodynamic characteristics. The propeller's propulsive force will be adjusted as a consequence of the increase or decrease in the carburettor position. This implies that the propeller's angle of attack is automatically increased or decreased to adjust the pre-set engine speed.

With model aircrafts are understood radio-controlled or self-monitored, unmanned, not full-scale aircrafts.

One objective of the present invention is to obtain a constant speed propeller controller for use in model aircrafts, allowing the use of a full-scale propeller and that the model engine at the same time may operate with maximum efficiency, independent of the speed of the aircraft.

Another objective of the present invention is to obtain a constant speed propeller controller of such a size and weight that it is practically usable in a model aircraft.

A further objective of the present invention is to obtain a constant speed propeller controller with a considerably more reasonable price than the technique mentioned.

DESCRIPTION OF THE INVENTION

Figure 1:
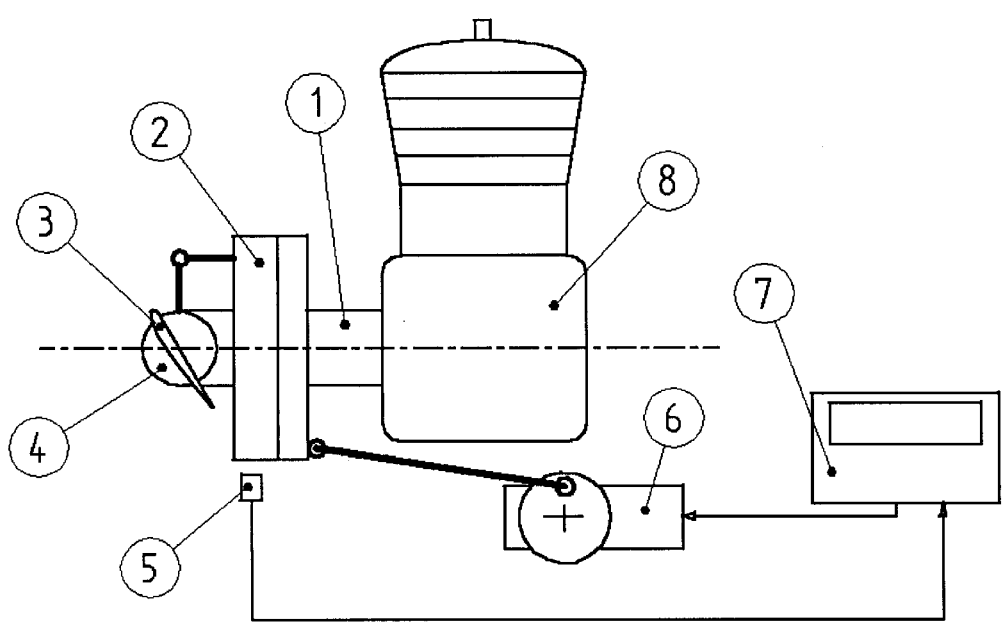
FIG. 1 is an overview of an engine with propeller and control device.

In FIG. 1, 1 denotes the power transmission of the engine. This transmission may either go directly from the engine shaft to the propeller's fitting or through a gear. The transmission may, e.g., through actuator slide 2, comprise stator, rotor and a bearing. The stator is coupled to a servomotor device, e.g., an electric servomotor known per se adjusting the propeller's angle of attack, based on signals from a micro controller 7. The stator is prevented from rotating, but may be moved axially, relative to the propeller shaft. The rotor is coupled to the propeller with one or more links, e.g. ball joint or cog wheel to each propeller blade in such a way that when the rotor is moved axially, then the attack angle of the propeller blades will change. The bearing holds the stator and rotor together.

The angle of attack is adjusted by rotating the propeller blades 3 with an angle given by the position of the actuator slide 2. The propeller blades 3 are linked to the propeller fitting 4 with one bearing, in order to change the angle of attack. Only the section of one propeller blade is shown in the illustration. A propeller speed sensor 5 measures the propeller speed and transmits data to the micro controller. An engine speed sensor may, e.g., also be used instead of a propeller speed sensor. Adjustment of the propeller's angle of attack is obtained through a servomotor 6, which is an electric engine controlled by the micro controller 7. The servomotor moves the actuator slide through a link to thus change the propeller blades' angle of attack. The micro controller unit 7, equipped with a keypad and a display, comprises one or more micro controllers, that from the speed measured by the speed sensor 5, compare the propeller's speed with the speed desired and pre-set by the user. Based on computations in the micro controller(s), control signals are transmitted with information about new position (angle of attack) to the servomotor 6.

The engine 8, which in the present invention is a model engine intended for use in model aircrafts, may have one or more cylinders and be of a two-stroke of four-stroke type. The engine uses standard fuel for model aircrafts, gasoline or another type of fuel for engines.

The micro controller 7 utilises an integrated software sequence of the PID regulator type to regulate the most efficient propeller angle of attack for the engine 8.

The micro controller 7 first reads the speed of the propeller. If the speed read is lower than the user-defined speed (desired speed), then the micro controller 7 will transmit signals to the attack angle servomotor 6, to the effect that it should reduce the attack angle of the propeller 3. This will reduce the resistance to the engine, giving an increase in engine speed. If the propeller speed is too high, relative to the user-defined speed, the pitch angle servomotor 6 will increase the angle of attack to the propeller. This will increase the resistance to the engine and the engine speed will decrease.

Figure 2:
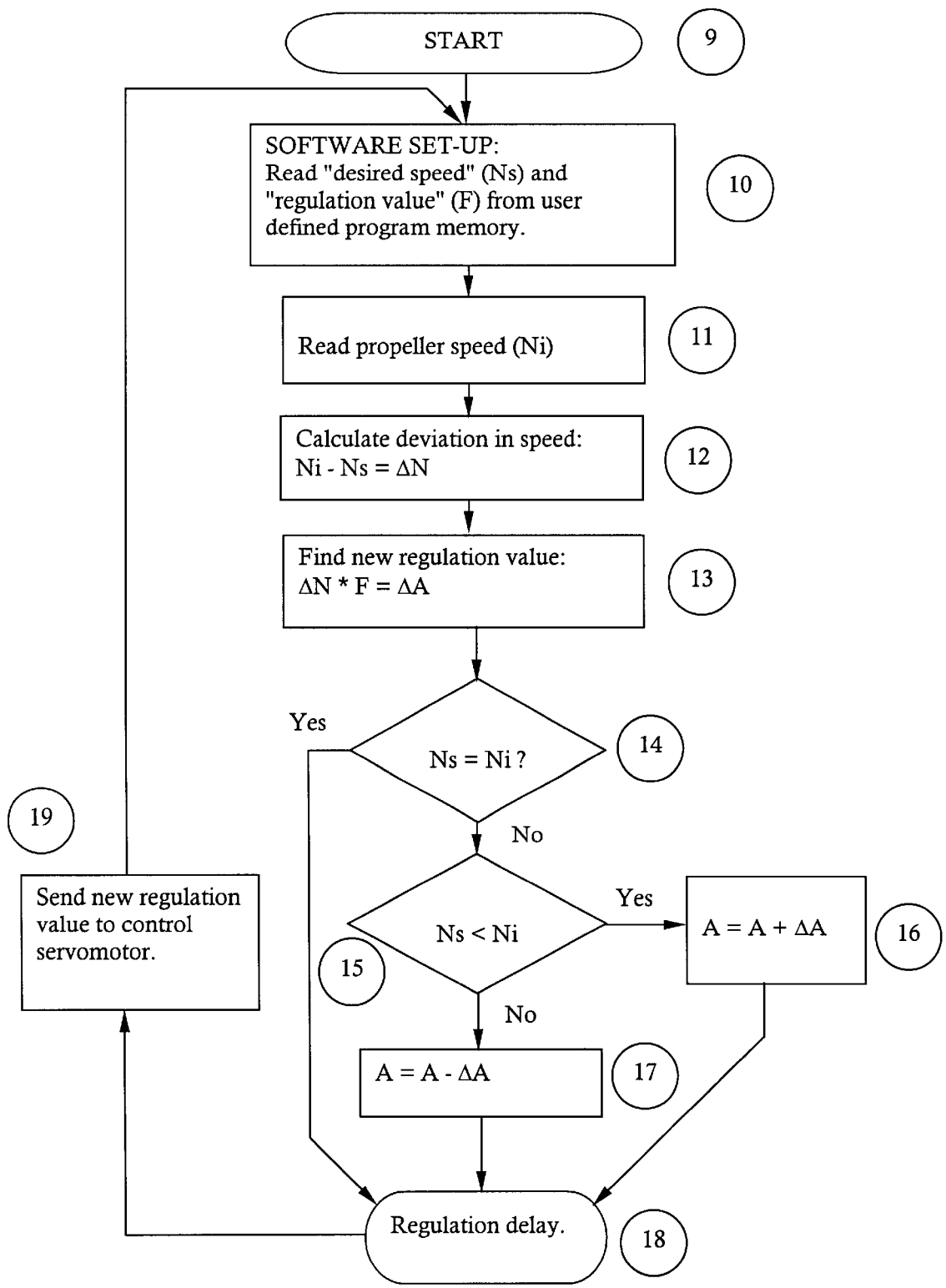
FIG. 2 shows the flow diagram of the software of the micro-controller.

FIG. 2 shows the software set-up of the micro controller (s). The programs executes the following sequence:

The sequences is started at 9 by feeding power to the micro controller, and a self-check is performed before the program continues. The self-check controls that the servomotor moves freely both ways, and that the propeller speed sensor is working. The program reads pre-programmed values at 10 and other values necessary for the regulation. At this stage the user may also change "desired speed", "regulation response" and the servomotor's end positions through the keypad and the display.

In the program loop 11 the software reads the propeller speed by means of the propeller speed sensor. This value is preliminary stored in the memory of the program. The micro controller compares at 12 the propeller speed with the desired speed. The speed deviation is preliminary stored in the memory of the program. The micro controller computes at 13 a new correction value to be used later in the program loop. By multiplying the speed deviation with the regulation response, the new correction value is found. The micro controller inquires at 14 whether the desired speed and speed read are approximately identical. If this is the case, the program will continue to 18.

If the desired speed and the read speed are not approximately identical, the micro controller will inquire at 15 whether the desired speed is lower than the speed measured. If the desired speed is lower than the speed measured, the micro controller will prepare at 16 a new and higher propeller angle of attack, by using previously computed values (at 13). If the desired speed is higher than the speed measured, the micro controller will prepare at 17 a new and lower propeller angle of attack, by using previously computed values (at 13).

A calculated regulation loop delay at 18 causes each program loop to take up the same amount of time. This restricts the oscillation in the regulation loop. The micro controller transmits a new position to the servomotor at 19 of the propeller angle of attack. This regulates the propeller's speed towards the desired propeller speed.

Testing of Prototype

A prototype of the present invention is built and tested. The prototype is built on the basis of the above description. Tests showed that the adjustment of the attack angle provided for maintaining the speed of the engine satisfactorily at the pre-programmed, desired speed.

Test

Before the engine was started, a speed of 6000 revolutions per minute and a regulation factor of "50" were programmed via the keypad and display. The engine was started at idling speed. Since the engine was idling, i.e. approx. 2000 rpm for the type of engine used, the propeller's angle of attack was automatically adjusted to 0 degrees in order to give as small resistance for the engine as possible. With careful carburettor admission, the speed of the engine increased quickly, as the load on the engine was very small. With approximately 20 percent carburettor opening, the engine reached 6000 rpm. With further carburettor opening, the propeller's angle of attack started to increase automatically, while the engine still held 6000 rpm. With one attempt with a sudden change of the carburettor position, from 50 per cent to 100 percent opening, a overswing of the engine speed could be heard and read on the display, before it was quickly stabilised at 6000 rpm.

What is claimed is:

1. A control device for use in unmanned model aircraft for a constant speed propeller comprising:

an unmanned model aircraft propulsion engine coupled to said constant speed propeller, wherein a rotational speed of said unmanned model aircraft propulsion engine is regulated through an automatic change of an angle of attack of said constant speed propeller and at least one of a manual and an automatic adjustment of a throttle;

an unmanned model aircraft power transmission positively coupled to said unmanned model aircraft propulsion engine;

an electric servomotor device, wherein said electric servomotor device is positively coupled to said constant speed propeller through said unmanned model aircraft power transmission, and an unmanned model aircraft controller, said controller controlling said electric servomotor device, said angle of attack of said constant speed propeller being adjusted by said unmanned model aircraft power transmission from said electric servomotor device and said unmanned model aircraft propulsion engine, wherein said adjustment of said angle of attack being at least one of a manual adjustment by an operator and an automatic adjustment by said unmanned model aircraft controller.

2. The control device in accordance with claim 1, further comprising:

a sensor, said sensor measures rotational speed of said unmanned model aircraft propulsion engine and gives an input signal to said unmanned model aircraft controller, wherein said unmanned model aircraft controller performs computations based on said input signal to said unmanned model aircraft controller and gives an output signal to said electric servomotor device, said angle of attack of said constant speed propeller being controlled and adjusted by said electric servomotor device through said unmanned model aircraft power transmission from said servomotor device to said constant speed propeller.

3. The control device in accordance with claim 2, wherein said sensor is a rotational speed sensor.

4. The control device in accordance with claim 1, further comprising:

a sensor, said sensor measures the rotational speed of said constant speed propeller and gives an input signal to said unmanned model aircraft controller, wherein said unmanned model aircraft controller performs computations based on said input signal to said unmanned model aircraft controller and gives an output signal to said electric servomotor device, said angle of attack of said constant speed propeller being controlled and adjusted by said electric servomotor device through said unmanned model aircraft power transmission from said servomotor device to the constant speed propeller.

5. The control device in accordance with claim 4, wherein said sensor is a rotational speed sensor.

6. The control device in accordance with claim 1, further comprising:

an adjustment device coupled to at least one of said propeller and said unmanned model aircraft propulsion engine, said adjustment device forming an interface with said human operator, by which adjustment device, said human operator may set said rotational speed of at least one of said unmanned model aircraft propulsion engine and said propeller to a desired value, and at least one of said rotational speed being set in advance and said rotational speed being set during flight.

7. The control device in accordance with claim 6, further comprising:

a keyboard and a display forming an interface with said operator.

* * * * *